(12) United States Patent
Long

(10) Patent No.: US 7,475,898 B2
(45) Date of Patent: Jan. 13, 2009

(54) LOAD CARRYING VEHICLE

(76) Inventor: Mark James Long, 5 Glenmore Close, Assagay, 3610 Pinetown (ZA)

( * ) Notice: Subject to any disclaimer, the term of this patent is extended or adjusted under 35 U.S.C. 154(b) by 109 days.

(21) Appl. No.: 10/550,844

(22) PCT Filed: Mar. 19, 2004

(86) PCT No.: PCT/IB2004/000810

§ 371 (c)(1),
(2), (4) Date: Jul. 25, 2006

(87) PCT Pub. No.: WO2004/085199

PCT Pub. Date: Oct. 7, 2004

(65) Prior Publication Data

US 2007/0040352 A1    Feb. 22, 2007

(30) Foreign Application Priority Data

Mar. 25, 2003   (ZA)   ................... 2003/2317

(51) Int. Cl.
*B60P 3/022* (2006.01)
*B62D 53/00* (2006.01)

(52) U.S. Cl. ................. 280/404; 280/405.1; 280/414.1; 410/77; 410/24

(58) Field of Classification Search ............. 280/414.1, 280/412, 413, 418.1, 424, 404, 405.1; 296/186.4, 296/184.1, 185.1; 414/812, 498, 495, 546; 410/77, 87, 26, 27, 24
See application file for complete search history.

(56) References Cited

U.S. PATENT DOCUMENTS

| | | | | |
|---|---|---|---|---|
| 2,656,216 A | * | 10/1953 | Bobroff | 296/185.1 |
| 2,931,262 A | * | 4/1960 | Erwin | 82/117 |
| 3,119,350 A | * | 1/1964 | Bellingher | 410/27 |
| 3,690,272 A | * | 9/1972 | Ogle et al. | 410/77 |
| 3,891,102 A | * | 6/1975 | Blount | 414/545 |
| 4,659,132 A | * | 4/1987 | Day | 296/186.4 |
| 4,668,141 A | * | 5/1987 | Petersen | 296/43 |
| 4,701,086 A | * | 10/1987 | Thorndyke | 410/26 |
| 5,088,785 A | * | 2/1992 | Lee | 296/26.05 |
| 5,096,216 A | * | 3/1992 | McCalla | 414/495 |

(Continued)

FOREIGN PATENT DOCUMENTS

EP    1 065 098 A1    6/2000

(Continued)

*Primary Examiner*—Hau V Phan
(74) *Attorney, Agent, or Firm*—Brinks Hofer Gilson & Lione

(57) ABSTRACT

The invention relates to a load carrying vehicle of the type that has a body forming a load carrying compartment (16) above a load deck (17), and where the load carrying compartment (16) is of the side loading type. The vehicle has a load carrying structure located in its load carrying compartment, the load carrying structure including a platform support structure that is located along the length of the load carrying compartment (16) along the centre line of the load deck (17). The platform support structure includes support formations that provide for the support of load platforms (42) of the load carrying structure, on which loads can be supported, at different levels above the two side halves of the load deck. The mode of support permits easy manual adjustment of the level of individual load platforms above the load deck.

20 Claims, 10 Drawing Sheets

U.S. PATENT DOCUMENTS

| | | | |
|---|---|---|---|
| 5,443,350 A * | 8/1995 | Wilson | 414/495 |
| 5,505,581 A * | 4/1996 | Gearin et al. | 414/498 |
| 5,595,465 A * | 1/1997 | Knott | 414/812 |
| 5,685,228 A * | 11/1997 | Ehrlich et al. | 296/184.1 |
| 5,803,698 A * | 9/1998 | Hoenersch et al. | 414/495 |
| 5,915,913 A * | 6/1999 | Greenlaw et al. | 414/495 |
| 6,283,040 B1 * | 9/2001 | Lewin | 105/404 |
| 6,328,525 B1 * | 12/2001 | Greenlaw et al. | 414/812 |
| 7,201,549 B2 * | 4/2007 | Long et al. | 410/77 |

FOREIGN PATENT DOCUMENTS

| | | |
|---|---|---|
| GB | 2 274 627 A | 1/1994 |
| WO | WO 02/40314 A2 | 5/2002 |

* cited by examiner

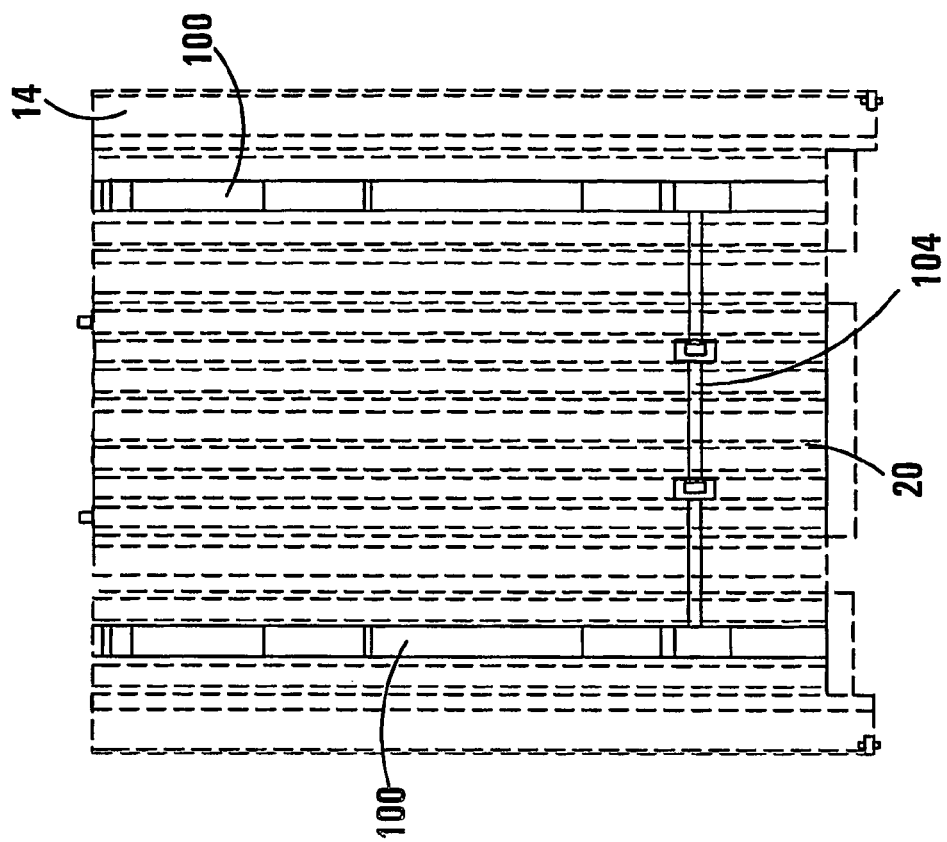
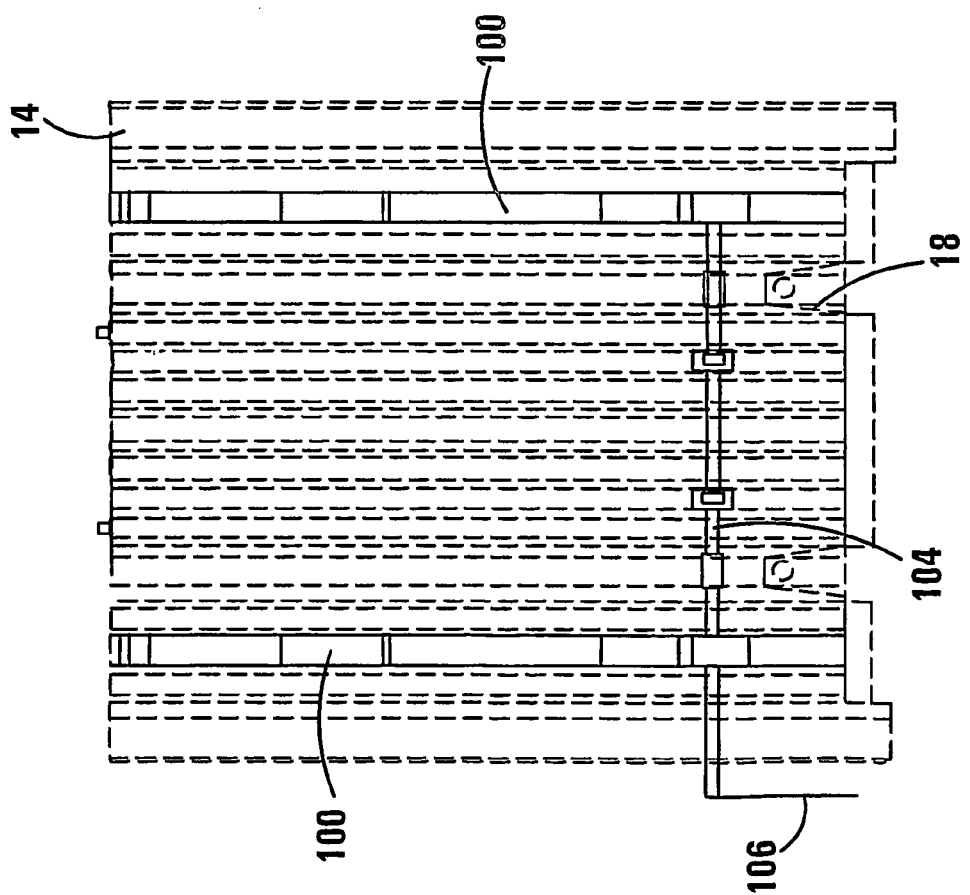

LOAD CARRYING VEHICLE

This application is a United States nationalization under 35 U.S.C. 371 of the International Application No. PCT/IB2004/000810, filed Mar. 19, 2004 and designating the United States, which claims priority to South African Application No. ZA 2003/2317, filed Mar. 25, 2003.

The invention relates in particular to a load carrying vehicle of the type that has a body forming a load carrying compartment above a load deck, where the load carrying compartment is of the side loading type and provides for the transportation of products carried on pallets, on load sheets, in containers, directly on the load deck, and the like. A load carrying vehicle of the above type either may be a truck having its own load carrying compartment, or may be a trailer to be towed by a horse. Any reference hereinafter to a load carrying vehicle must be interpreted as such.

The invention will herein generally be described with reference to the location of a load item within the load carrying compartment of a load carrying vehicle, a load item, as referred to herein, comprising any one of a product to be supported directly on a surface provided by a load carrying vehicle for this purpose, a product and a load sheet on which it is carried, a product and a pallet on which it is carried, a product and a container in which it is carried, a pallet only, and the like. Furthermore, references herein to the centre line of the load deck of a load carrying vehicle must be interpreted as a reference to an imaginary line defined along the entire length of the load deck of the load carrying vehicle and dividing it into two equal side halves. A side half of a load deck, as is referred to hereinafter, must be interpreted accordingly.

The general configuration of a load carrying vehicle of the type herein envisaged is well known and insofar as this does not form a part of the present invention, this is not described in any further detail herein. It is also well known in relation to a load carrying vehicle of the type, that the space utilization of the load carrying compartment can be very inefficient when transporting load items, particularly voluminous-type items. In particular, when carrying such load items, it is often not possible to stack one load item on another, insofar as the lower load item can be damaged thereby.

The spaces within the load carrying compartments of load carrying vehicles are thus either utilized inefficiently or, despite the possibility of load items being damaged, in order to minimize transportation costs, load items are in fact stacked on one another, resulting in lower load items collapsing, or being otherwise damaged.

In order to alleviate the above problems in relation to the use of load carrying vehicles of the type herein envisaged, the Applicant has proposed, in his international patent application number PCT/IB01/02150, to provide for the location of a platform support structure along the centre line of the load deck of a load carrying vehicle and the support of load platforms by the platform support structure at elevated levels above the side halves of the load deck, at locations between opposite ends of the load deck.

Load items can thus be supported at different levels in the load carrying compartment of a vehicle having such a load support structure and support platforms, without being stacked directly on one another, thus alleviating at least the damage problem referred to above. In order to optimize space utilization, the height of platforms above a load deck must be rendered adjustable so that load items having different heights can be accommodated, and although such height adjustment is provided for in the disclosure of the Applicant's above international patent application, the height adjustment means as envisaged proved extremely complicated, expensive and difficult to utilize. As such, it is an object of this invention to at least alleviate this particular problem.

According to the invention there is provided a load carrying vehicle which has a body forming a load carrying compartment above a load deck, the vehicle including a load item carrier structure that is located within the load carrying compartment and that includes a plurality of load platforms for supporting load items thereon; and a platform support structure located along the longitudinal centre line of the load deck, the platform support structure defining, for each load platform, a plurality of support formations at different levels above the load deck and providing for at least partial support of the load platform at a selected level above a side half of the load deck, as determined by the support formations.

Each load platform of the load item carrier structure particularly comprises a substantially rectangular platform which can be supported by the platform support structure at locations coinciding with one longitudinal edge of the platform.

The platform support structure may include, for each load platform, a pair of spaced support posts that define the support formations for the load platform and that are secured between the load deck and the body forming the load carrying compartment where the body defines the roof of the load carrying compartment.

Each pair of support posts may define support formations for supporting, at least partially, a load platform on each side of the centre line of the load deck above each half of the load deck. Also, insofar as the platform support structure will include a plurality of pairs of support posts along the center line of the load deck between opposite ends thereof, adjacent pairs of support posts each may have a common post that provides for at least partial support of a platform on each side thereof, along the length of the load deck.

The support formations defined by the support posts typically provide for pivotal engagement of load platforms with respect to support posts, permitting displacement of the platforms between an operative position, in which they are disposed substantially parallel to the load deck of the vehicle above the load deck and in which load items can be supported thereon, and an inoperative position, in which they are folded substantially into a plane defined by the support posts.

Particularly for load platforms that are pivotally engaged with respect to their support posts, each load platform may have pin-like formations projecting longitudinally therefrom in opposite directions from opposite sides thereof and the support formations defined by the support posts may define complementary engagement formations that can receive and locate respective pin-like formations in a configuration in which pivotal support of the platform is provided for.

Further according to the invention, the platform support structure may include at least one holding member for each platform, for holding the platform in its operative position. Particularly, the platform support structure includes two holding members for each platform.

The holding members may, for each load platform, comprise adjustable length legs that can act between the load platform and the load deck of the vehicle for holding the platform in its operative position. The adjustable length legs for each load platform may be secured to their platform at a location along the longitudinal edge of the platform that is disposed remote from the longitudinal edge thereof that is supported by the support posts, the operative lower ends of the legs being releasably locatable with respect to the load deck to provide for the support of the load platform in its operative position. The legs for each platform may be hingedly secured to their load platform in a configuration in which they can fold onto the platform and be held in this position with respect to the platform, while the platform is disposed in its inoperative position.

For the above configuration holding members, the load carrying vehicle of the invention may have straps that can be suspended from the roof defined by the body of the load carrying compartment thereof, the straps defining engagement formations along the length thereof that are releasably engageable with complementary formations defined along the edge of each platform remote from the posts permitting, through such engagement, release of the platform from the posts and hence, by a tilting action, raising or lowering of the platform with respect to the posts and re-engagement with the posts, following which the length of the legs can be adjusted and the platform can be released from the straps. The straps thus permit, by a simple manual operation, the height adjustment of platforms above the load deck of the load carrying vehicle.

The holding members of the platform support structure of the load carrying vehicle of the invention alternatively may be, for each load platform, elongate struts that act between their platform and the support posts supporting the platform, the struts being pivotally secured to their platform and releasably engageable with respect to the support posts supporting the platform at different levels, that accommodate different platform levels. The ends of the struts that are engaged with support posts particularly define pin-like formations projecting therefrom and, as such, the support posts may define complementary engagement formations that can receive and locate the pin-like formations in a configuration in which adjustment of the position of the struts with respect to their support posts is permitted. Particularly, for adjusting the level of a particular platform above a load deck, for example upwards, the process, which is a manual process, may include releasing the engagement between the struts and the support posts, tilting the platform up and re-engaging the posts at a required higher level, then releasing the engagement between the platform and the posts, tilting the platform back to a horizontal position and re-engaging the platform with the posts. This again is considered a quick and simple operation.

The load carrying vehicle of the invention further may include locking means for releasably locking each platform in its load carrying configuration with respect to the platform support structure at each selected level above a side half of the load deck. The locking means may include locking pins that can cooperate with the platform support structure.

Still further according to the invention, the roof defined by the body of the load carrying compartment of the load carrying vehicle of the invention may be secured on the walls defined by the body that surround the compartment, in a configuration in which the roof can be raised with respect to the said walls into a position in which loading of the load carrying compartment is facilitated. As such, the load carrying vehicle may include a lifting and lowering mechanism for lifting and lowering the roof defined by the body of the load carrying compartment, the lifting and lowering mechanism being operable externally of the compartment by a lever arrangement.

The invention extends also to a load item carrier structure for a load carrying vehicle having a body forming a load carrying compartment above a load deck, the load item carrier structure, in its operative configuration located within the load carrying compartment of a vehicle, including a plurality of load platforms for supporting load items thereon; and a platform support structure located along the longitudinal centre line of the load deck of the vehicle, the platform support structure defining, for each load platform, a plurality of support formations at different levels above the load deck and providing for at least partial support of the load platform at a selected level above a side half of the load deck, as determined by the support formations.

This load item carrier structure may additionally include all the features of the load item carrier structure of the load carrying vehicle of the present invention.

Further features of the invention are described hereafter with reference to two examples of load carrying vehicles, in accordance with the invention, that are illustrated in the accompanying diagrammatic drawings. In the drawings:

FIG. 12 shows a front view of the head board of the load carrying compartment of the front trailer part of the vehicle of FIG. 1;

FIG. 13 shows a rear view of the tail board of the load carrying compartment of the front trailer part of the vehicle of FIG. 1;

Figure 1:
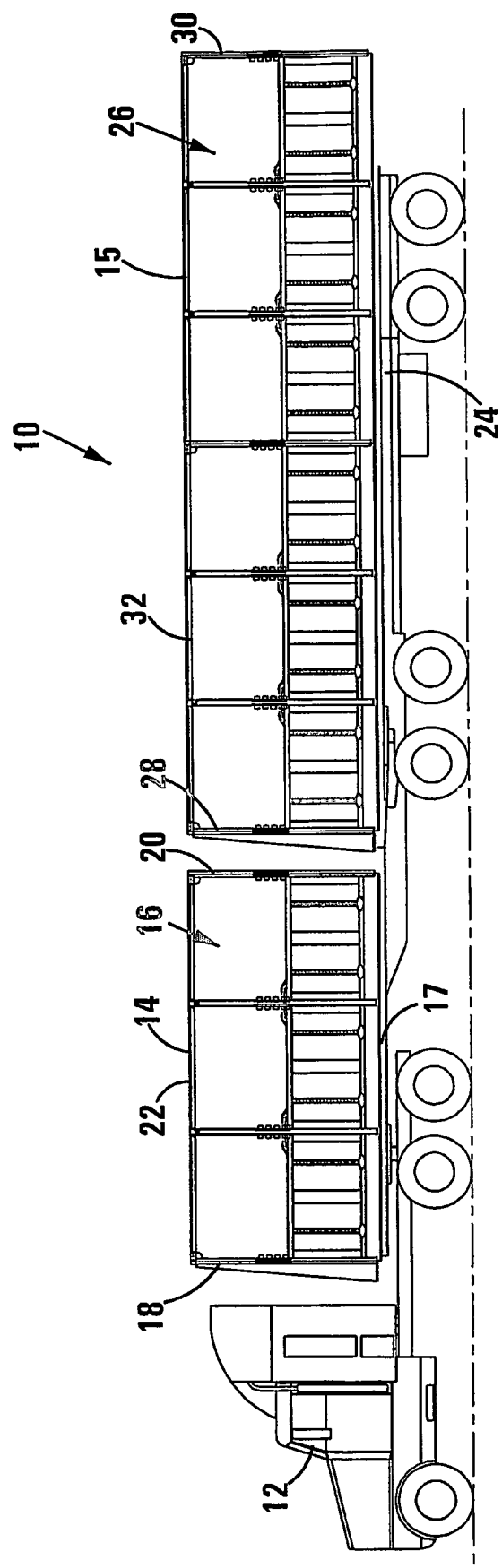
FIG. 1 shows a schematic side view of a first embodiment of a load carrying vehicle, in accordance with the invention.

Referring initially to FIG. 1 of the drawings, a load carrying vehicle, in accordance with the invention, is designated generally by the reference numeral 10. The load carrying vehicle 10 is a horse and trailer-type vehicle including a horse 12, a front trailer 14 coupled with the horse by a fifth wheel coupling arrangement and a rear trailer 15 coupled with the front trailer 14. The front trailer 14 has a load deck 17 above which a load carrying compartment 16 is defined by a body including a head board 18, a tail board 20, a roof 22 and side walls (not shown) that are of a type that permit side loading of the compartment 16.

The rear trailer 15 similarly has a load deck 24 above which a load carrying compartment 26 is defined by a body including a head board 28, a tail board 30, a roof 32 and side walls (not shown) that again permit side loading of the load carrying compartment 26.

Insofar as the overall outward configuration of the vehicle 10 and, particularly, the configurations of the front trailer 14 and the rear trailer 15 are essentially conventional, these are not described in any further detail herein. Both the front trailer 14 and the rear trailer 15 have a load item carrier structure mounted therein, this structure being described in more detail hereafter.

Figure 2:
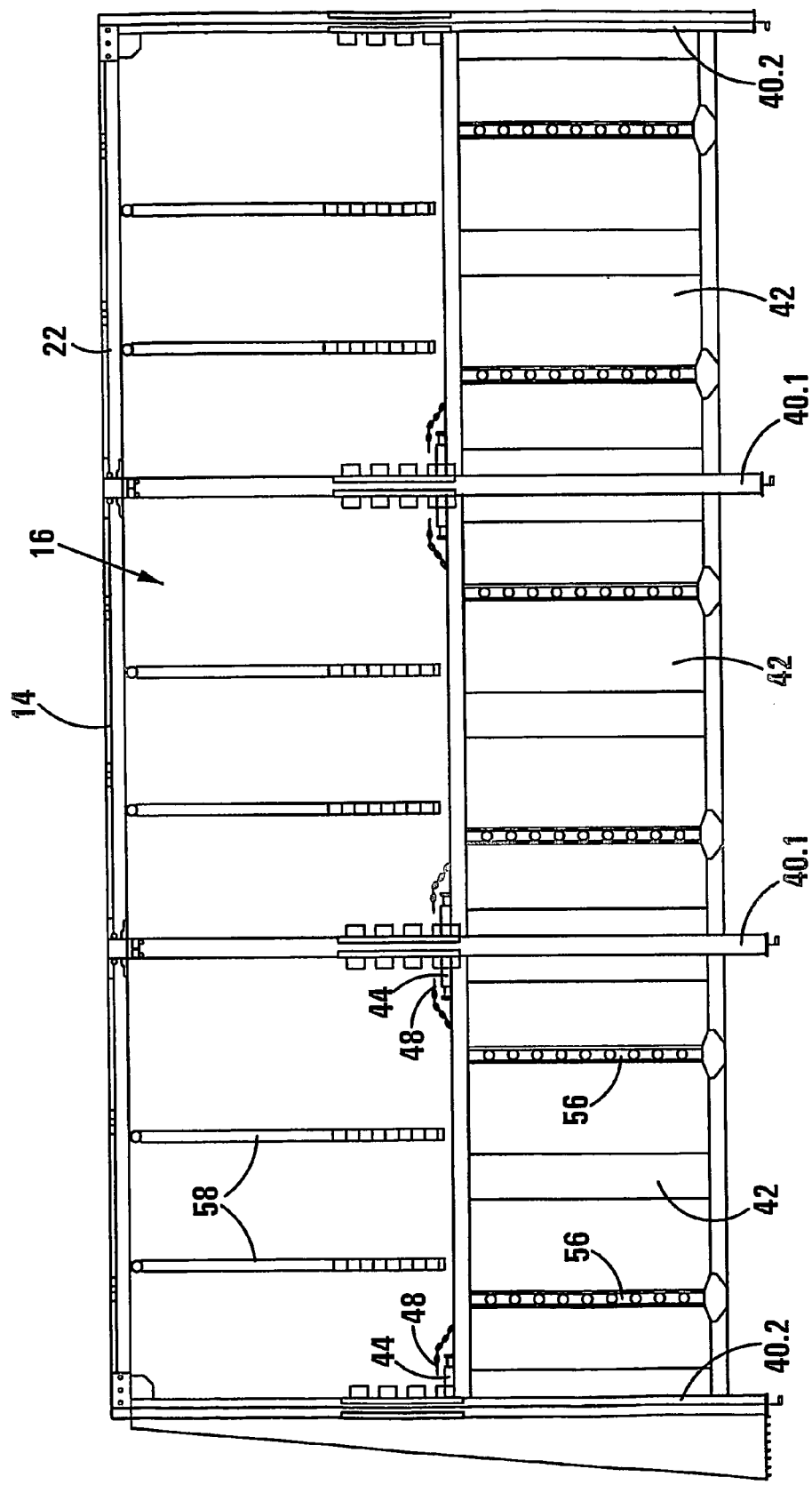
FIG. 2 shows a more detailed side view of the front trailer part of the vehicle of FIG. 1.
Figure 3:
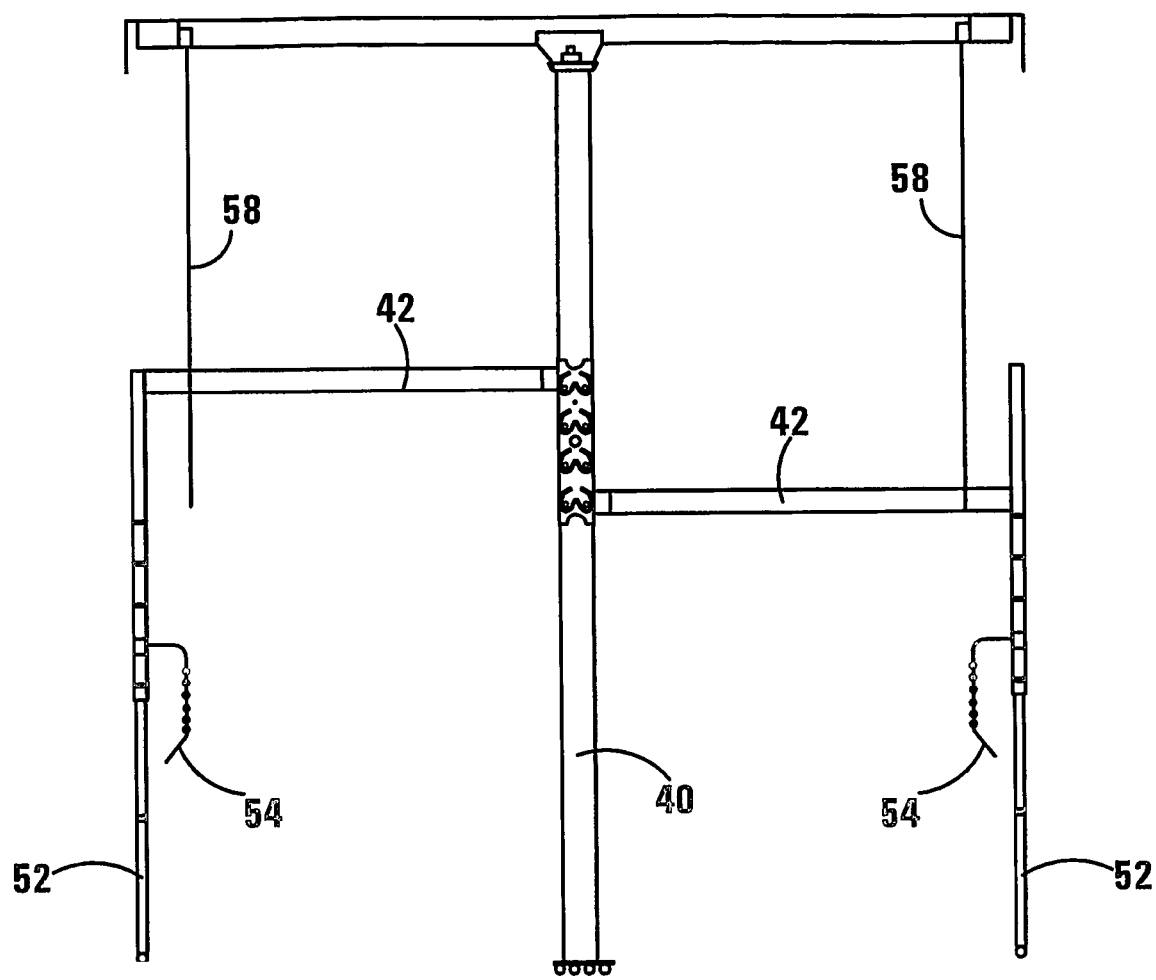
FIG. 3 shows a front end view of the front trailer part of FIG. 2 as seen at a location between its opposite ends.

Referring particularly to FIGS. 2 to 5 of the drawings, the body defining the load carrying compartment 16 of the front trailer 14 is shown in more detail. Along the centre line of the load deck 17 of the trailer 14 there are secured a plurality of support posts 40, the support posts particularly being secured between the load deck 17 and the roof 22 of the body defining the compartment 16. Each pair of adjacent support posts support two platforms 42 between them in the configuration described hereafter, the platforms being displaceable between an operative position as shown in FIG. 3 of the drawings, in which they extend in opposite directions from the support posts 40 to be disposed in a parallel configuration with respect to the load deck 17, respectively above the two side halves of the load deck, and an inoperative position as shown in FIG. 2 of the drawings, in which they are folded into the general plane defined by the support posts 40.

Figure 4:
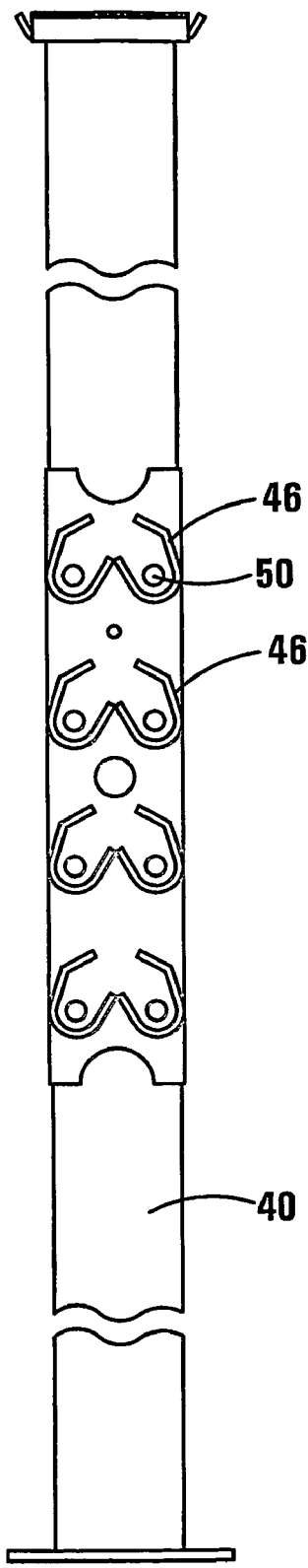
FIG. 4 shows a side view of a support post of the load carrying vehicle of FIG. 1.
Figure 5:
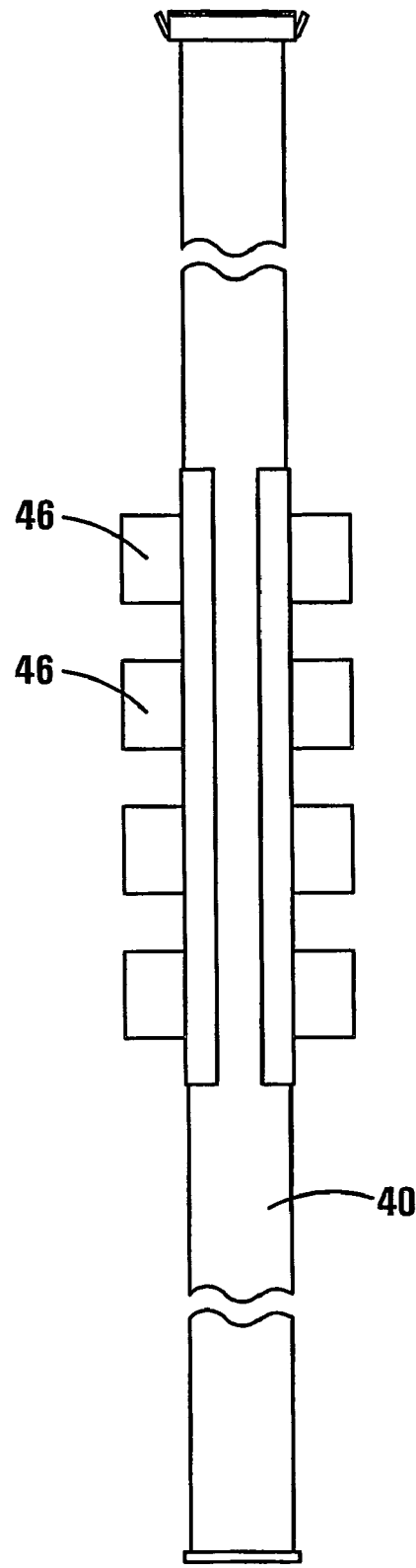
FIG. 5 shows a front view of the support post of FIG. 4.
Figure 6:
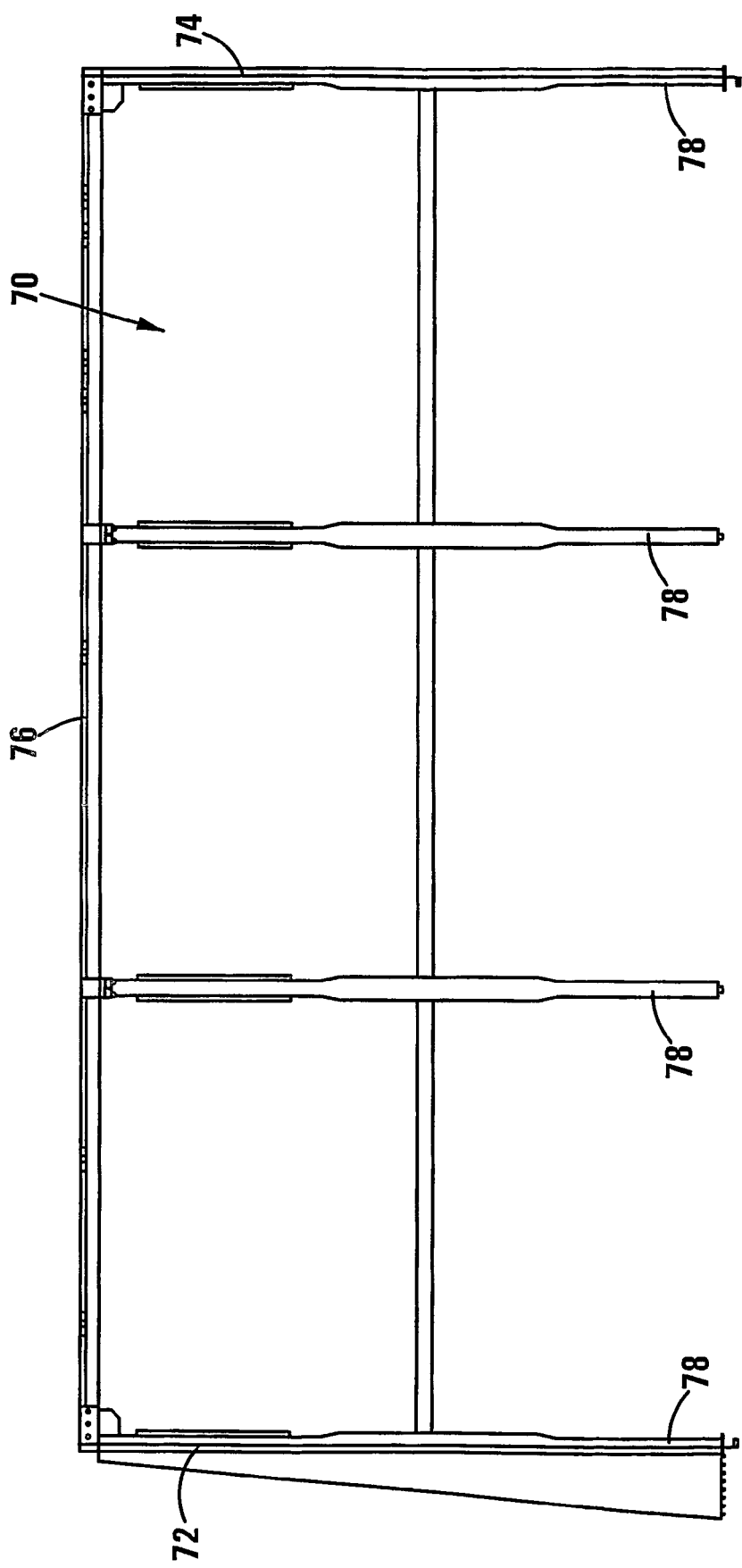
FIG. 6 shows a schematic side view of the front trailer part of a second embodiment load carrying vehicle, in accordance with the invention, with certain parts being deleted for the sake of clarity.
Figure 7:
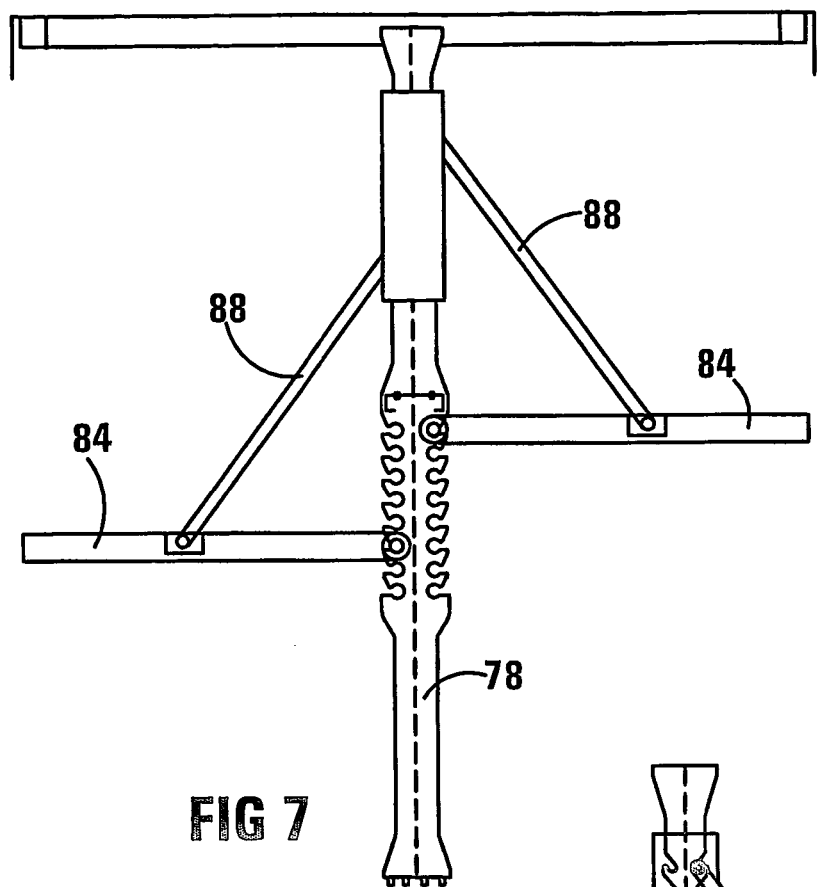
FIG. 7 shows a front end view of the trailer part of FIG. 6 as seen at a location between its opposite ends.
Figure 8:
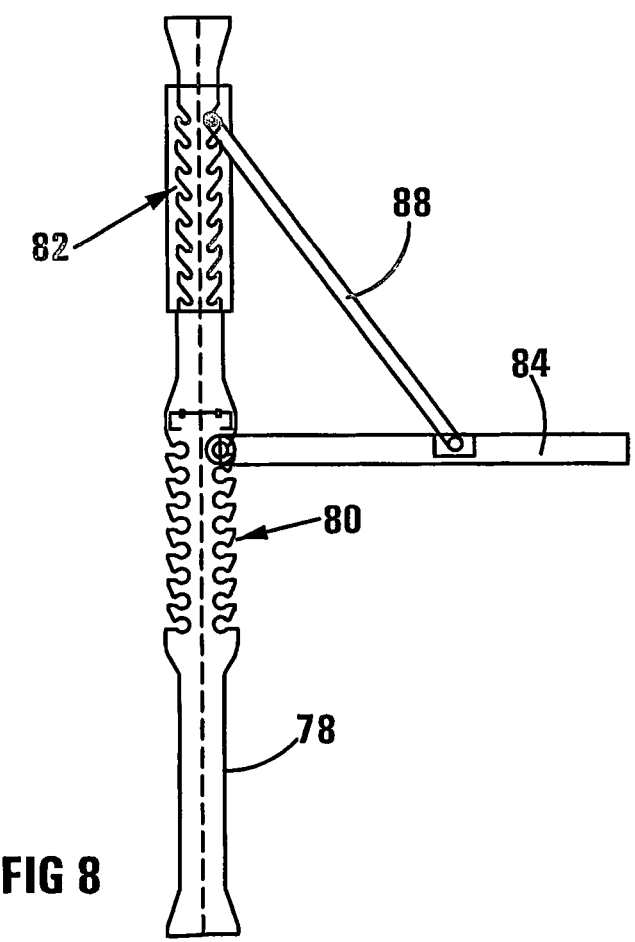
FIG. 8 shows a more detailed front end view of the part of the vehicle as shown in FIG. 7.
Figure 9:
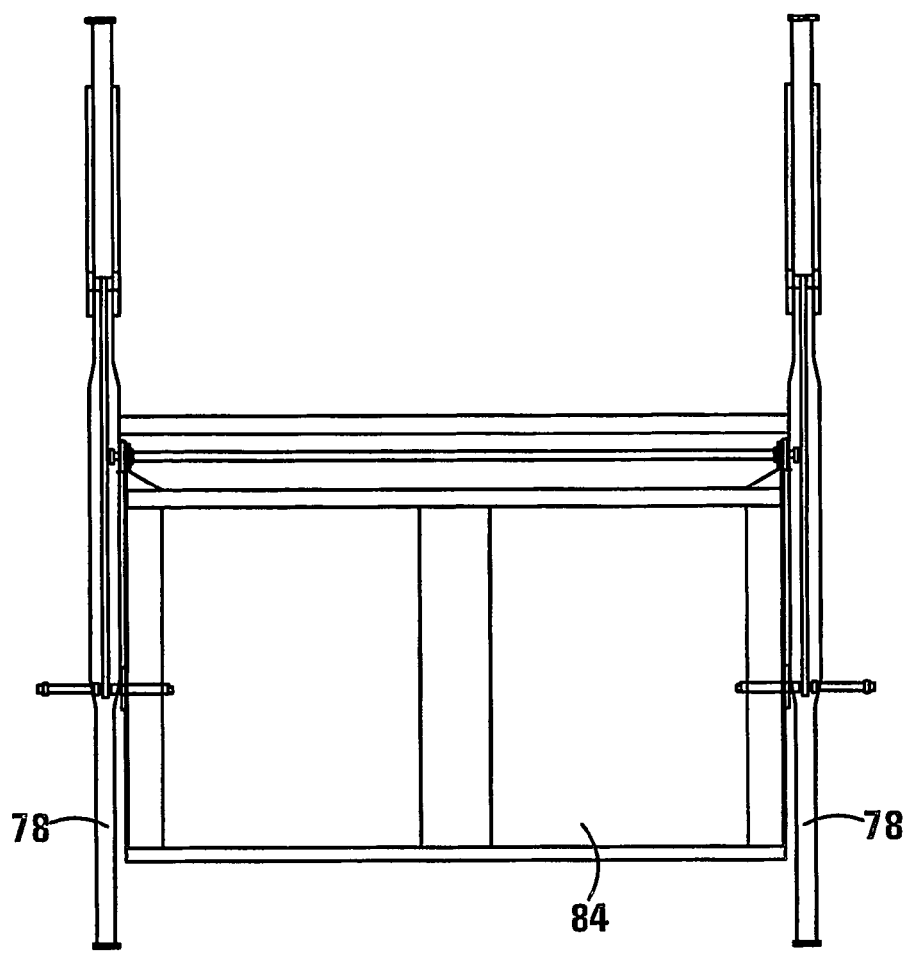
FIG. 9 shows a front end view of the part of the vehicle as shown in FIG. 8.
Figure 10:
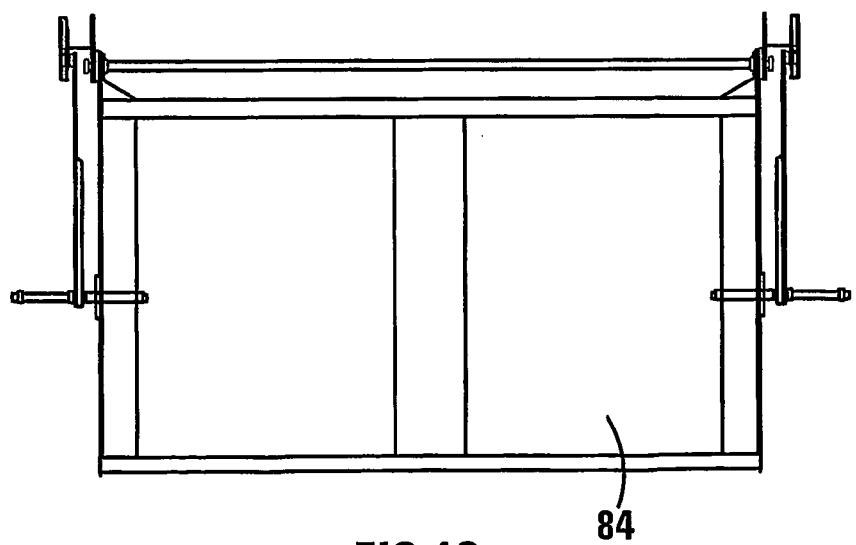
FIG. 10 shows a plan view of the part of the vehicle as shown in FIG. 8.
Figure 11:
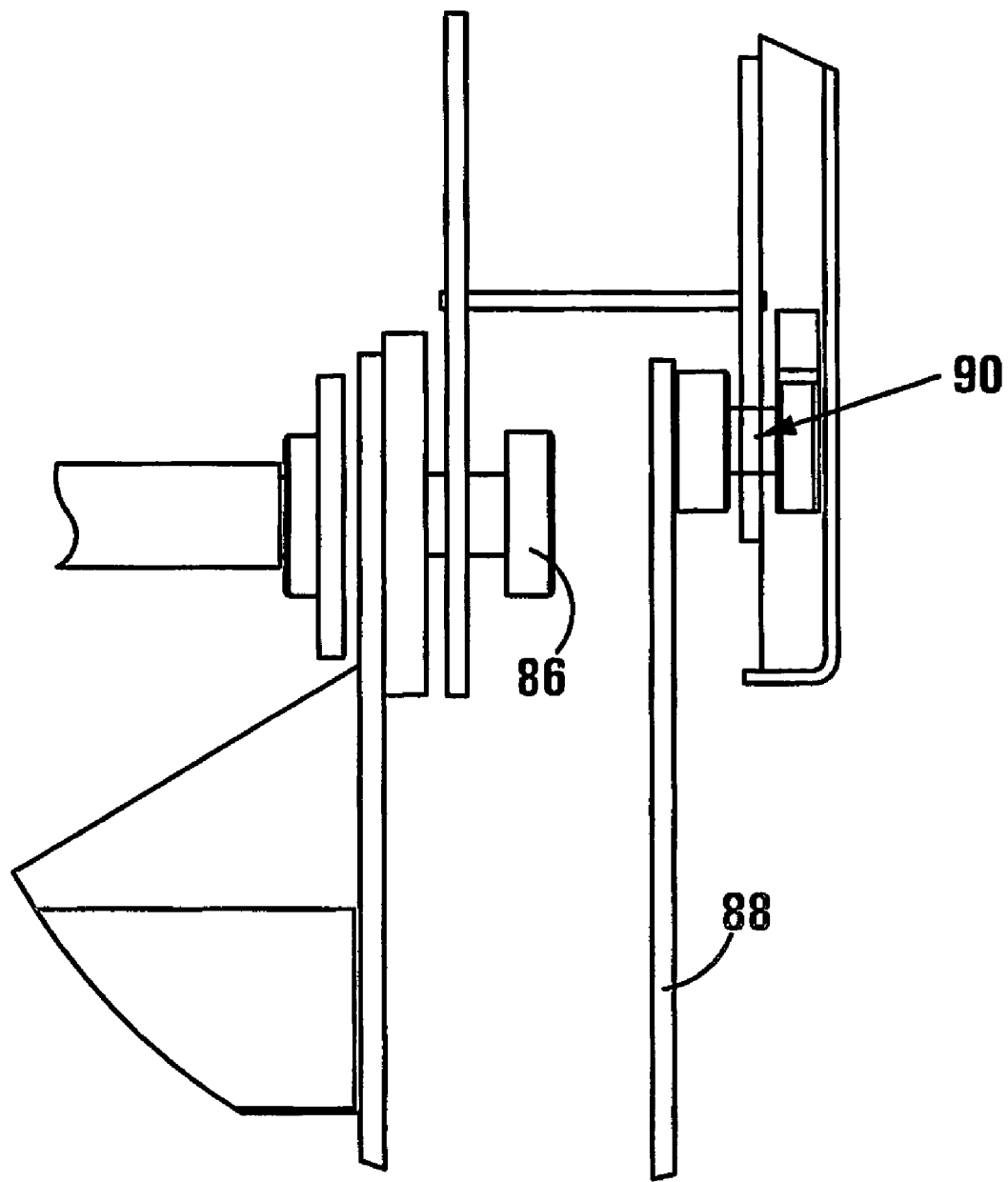
FIG. 11 shows a detail of the segment as circled in FIG. 10.

More particularly, each load platform 42 has two tubular locating pins 44 secured thereto and projecting beyond the operative sides thereof as shown in FIG. 2 of the drawings, the pins being formed to be received within support formations 46 that are secured to and that project from the posts 40 (see FIGS. 4 and 5 of the drawings). The pins 44 are thus effectively engaged within the support formations 46, to provide for pivotal engagement of each platform 42 with respect to a pair of posts 40. Locking pins 48 can pass through the tubular locating pins 44 and engage holes 50 defined in the posts 40, to secure the pivotal location of the platforms 42, adjustment of the location of the platforms with respect to the posts thus requiring removal of the pins 48.

It will be appreciated that for the particular configuration of the invention as illustrated in FIGS. 2 to 5 of the drawings, each platform is height adjustable with respect to the load deck of the trailer 14, with four predefined height positions being determined by the support formations 46 that are secured to the posts 40. It will also be appreciated that the central two support posts 40.1 each serve to support one end of four load platforms 42, whereas the outer posts 40.2 each serve to support one end of two load platforms 42.

In order to hold the load platforms in their operative position, each platform is associated with two adjustable length legs 52 (see particularly FIG. 3), each leg comprising two telescopically displaceable elements that are displaceable with respect to one another between four predetermined positions, in which holes in the elements are in register with one another and locking pins 54 can be located within the registering holes for securing the length of the leg 52. It will be understood in this regard that the different operative lengths of the legs 52 will coincide with the different operative heights at which the support platforms can be positioned above the load deck of the trailer 14. The operative lower ends of the legs 52 are securely locatable within receiving formations defined therefor in the load deck 17, to thereby secure the location of the legs in their operative position as shown in FIG. 3 of the drawings. Receiving formations 56 further are provided on the load platforms 42 for receiving the legs 52 therein while the platforms are disposed in their inoperative position, as shown in FIG. 2 of the drawings. It must be appreciated that the exact constructional configuration of the support legs in association with support platforms and support posts is greatly variable, with various mechanical constructions being envisaged in this regard.

The trailer 14 can thus have load items positioned therein in a conventional configuration, while the load platforms are displaced into their inoperative position. Otherwise, with selected load platforms disposed in their operative position, load items can be supported at different levels within the load compartment without being stacked directly on one another. It will be appreciated in this regard that with load items so supported at different levels, damage to lower load items is effectively avoided, while the height adjustability of the platforms 42 can ensure effective space utilization within the compartment 16, i.e. load items can take up substantially the entire space between the load deck and the roof of the load carrying compartment.

In order to facilitate height adjustment of load platforms, elongate straps 58 are suspended from the roof of the load carrying compartment along the operative outer edges thereof, the straps defining loop formations along the length thereof that enable engagement with complementary hook formations provided along the operative outer edges of the platforms 42. Such engagement permits platforms to be disengaged from their support posts and re-engaged therewith at different levels through suitable tilting of the platforms, such tilting hence permitting also length adjustment of associated legs 52 to complete the height adjustment of platforms, whereafter the straps 58 can again be disengaged from the platforms. This clearly provides an extremely simple and quick process for adjusting the height of load platforms, thus facilitating use of the invention.

It will be understood that a similar arrangement can be provided within the rear trailer 15 of the vehicle 10 and thus is not described in further detail herein.

Referring now to FIGS. 6 to 11 of the drawings, the body forming the load compartment of the front trailer of a second embodiment vehicle, in accordance with the invention, is schematically illustrated. The compartment in this instance is indicated by the numeral 70 and is defined by a body including a head board 72, a tail board 74, a roof 76 and side walls (not shown) which again permit side loading of the associated trailer. The compartment 70 again is defined above a load deck of the trailer, which is not shown in the drawing.

For this particular embodiment of the invention, support posts 78 are again secured in spaced locations along the centre line defined by the load deck, particularly between the load deck and the roof 76 of the body defining the compartment 70. Each support post 78 defines a back-to-back channel configuration in plan view, with the side walls of the oppositely directed channels each defining a first set of hook-like support formations 80 and a second set of hook-like support formations 82 along the length thereof. The support posts 78 again define pairs between which load platforms 84 are pivotally located, each load platform 84 having two engagement formations 86 which are configured each to pivotally engage one of the support formations 80, for the pivotal location of the platform 84 between two support posts 78.

The load platforms are thus again displaceable between an operative position and an inoperative position, holding members for holding the platforms in their operative position in this case comprising struts 88. In particular, each side of each platform 84 has a strut 88 pivotally secured thereto, with the opposite ends of the struts each defining an engagement formation, generally indicated by the reference numeral 90, that can securely engage one of the support formations 82. The particular support formation 82 that is engaged is determined by the particular support formation 80 that is engaged by the platform 84. The specific mechanical arrangement between the platforms 84 and the support posts 78 is clear from the drawings and, as such, is not described in further detail herein. Also, it must be understood that the exact mechanical configuration in this regard is greatly variable, while still incorporating the main features as described.

In order to provide for height adjustment of a platform 84, the process is initiated by disengaging the struts of the platform from the support formations 82 engaged thereby and then, through tilting of the platform, re-engaging the struts with suitable support formations as determined by the intended operative height of the platform to be adopted. Once so engaged, the platform itself can be disengaged from its support formations 80 and re-engaged with the support formations that will provide for the required height of the platform. Thus, once again, height adjustment of the platforms constitutes a simple and quick operation that will not unduly affect the packing time of load items into the load compartment 70.

It must again be appreciated that the load platform arrangement as described with reference to FIGS. 7 to 11 of the drawings can be equivalently applied to rear trailers of load carrying vehicles and generally within the load compartments of any other vehicles that are of the side loading type and where similar parameters apply.

Particularly in respect of the front trailers of horse and trailer-type load carrying vehicles as described above, it will be understood that the spacing between the roof of the load carrying compartment and the load deck of the trailer is less than for rear trailers, this being clearly apparent from FIG. 1 of the drawings. Although not specifically limited to front trailers, in order to facilitate loading of such a trailer optimally to the roof thereof, it is envisaged that the roof can be raised and lowered with respect to the head board and tail board with respect to which the roof is supported, this being illustrated clearly in FIGS. 12 to 15 of the drawings. With like parts being designated by the same reference numeral as before, the head board of the front trailer 14 of the vehicle 10 is designated by the reference numeral 18, whereas the tail board is designated by the numeral 20. In practice, the roof (not clearly shown) of the body forming the compartment spans the head board and the tail board, having opposite ends resting thereon (not shown).

Figure 14:
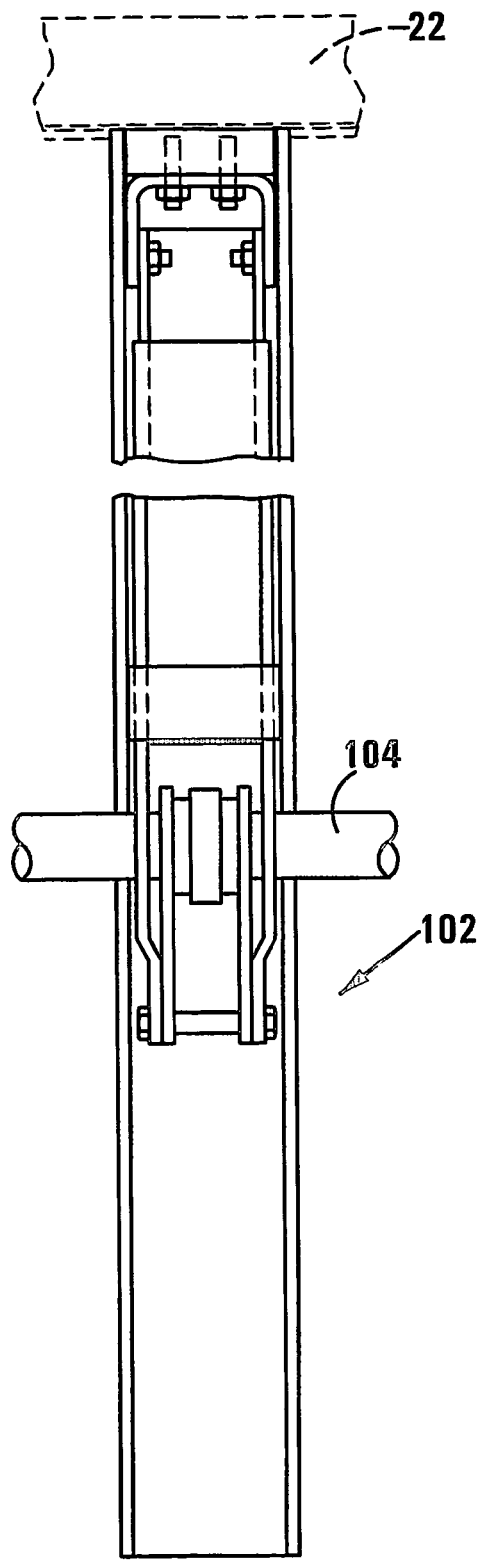
FIG. 14 shows a front view of a lifting mechanism associated with the roof of the load carrying compartment of FIG. 1, as supported above the head board and the tail board as shown in FIGS. 12 and 13.
Figure 15:
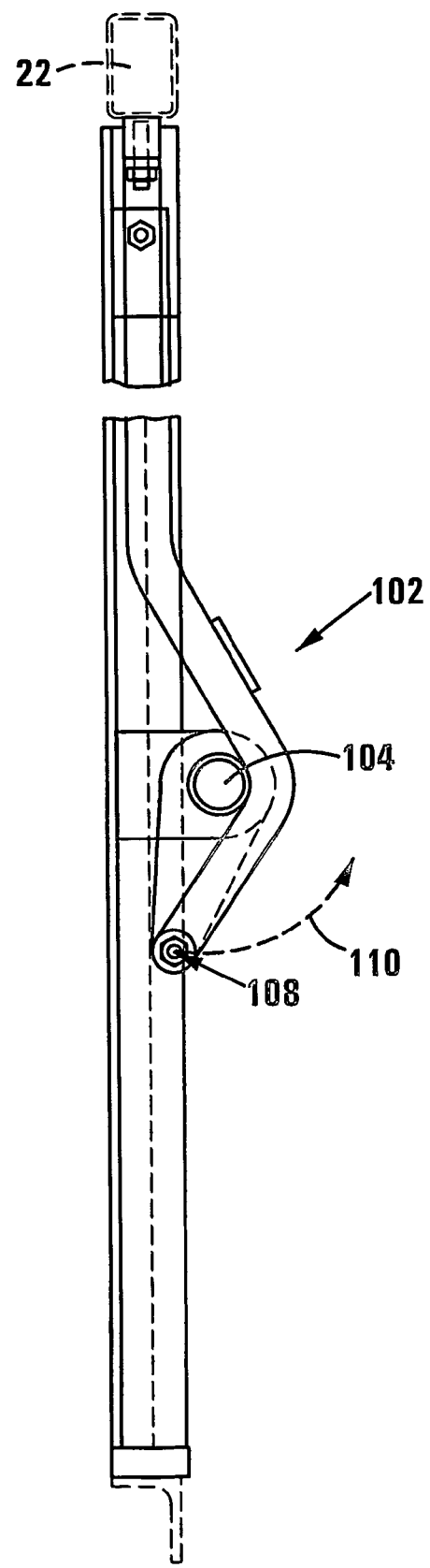
FIG. 15 shows a side view of the lifting mechanism as shown in FIG. 14.

Externally of both the head board and the tail board, there are provided two linearly displaceable lifting members 100 that have their operative top ends secured to the roof 22 (see FIGS. 14 and 15). Linear displacement of the members 100 provide for the roof 22 to be raised above the top edge of the head board and the tail board to a level at which loading of load items without interference into the compartment 16 is permitted. After loading, the roof 22 can again be lowered into its normal position in which it rests on the head board 18 and the tail board 20, thus providing normal protection to load items within the compartment during transportation.

As is clear from FIGS. 12 and 13, the lifting members 100 are engaged with a pivotally displaceable lever arrangement generally designated by the numeral 102, the two lever arrangements on each of the head board 18 and the tail board 20 being mechanically connected by a rotatable operating shaft 104 that can be rotated by a handle 106, in order to provide for lifting and lowering of the members 100. Raising of the roof 22 particularly is provided by displacement of the linkage point 108 about the shaft 104 in the direction of arrow 110, while lowering of the members 100 will be associated with reverse displacement. Once again, the mechanical operation and construction of the mechanism as described with reference to FIGS. 12 to 15 is greatly variable and also insofar as the operation of the particular arrangement is clearly apparent from the drawings, this is not described in further detail herein.

It will be appreciated that the raising and lowering of the roof of load carrying compartments of vehicles can be associated with any other load carrying vehicles also, where this may serve a beneficial purpose.

In general, it must be understood that by associating a load carrying vehicle with a load item carrier structure as herein envisaged, i.e. support posts and support platforms, space utilization within such vehicles can be greatly enhanced. Also, by avoiding the need to stack items on one another, damage to load items is effectively avoided. Both effective space utilization and the prevention of damage to load items render use of load carrying vehicles, in accordance with the invention, economically feasible.

The invention claimed is:

1. A load carrying vehicle which has a body forming a load carrying compartment above a load deck, the vehicle including a load item carrier structure that is located within the load carrying compartment and that includes
    a plurality of load platforms for supporting load items thereon; and
    a platform support structure located along the longitudinal centre line of the load deck, the platform support structure defining, for each load platform, a plurality of support formations at different levels above the load deck and providing for at least partial support of the load platform at a selected level above a side half of the load deck, as determined by the support formations.

2. The load carrying vehicle as claimed in claim 1, in which each load platform comprises a substantially rectangular platform which can be supported by the platform support structure at locations coinciding with one longitudinal edge of the platform.

3. The load carrying vehicle as claimed in claim 1, in which the platform support structure includes, for each load platform, a pair of spaced support posts that define the support formations for the load platform and that are secured between the load deck and the body forming the load carrying compartment where the body defines the roof of the load carrying compartment.

4. The load carrying vehicle as claimed in claim 3, in which each pair of support posts defines support formations for supporting, at least partially, a load platform on each side of the centre line of the load deck above each half of the load deck.

5. The load carrying vehicle as claimed in claim 3, in which the platform support structure includes a plurality of pairs of support posts along the centre line of the load deck between opposite ends thereof, adjacent pairs of support posts each having a common post that provides for at least partial support of a platform on each side thereof, along the length of the load deck.

6. The load carrying vehicle as claimed in claim 3, in which the support formations defined by the support posts provide for pivotal engagement of each load platform with respect to support posts, permitting displacement of the platform between an operative position, in which the platform is disposed substantially parallel to the load deck of the vehicle above the load deck and in which load items can be supported thereon, and an inoperative position, in which the platform is folded substantially into a plane defined by the support posts.

7. The load carrying vehicle as claimed in claim 6, in which each load platform has pin-like formations projecting longitudinally therefrom in opposite directions from opposite sides of the platform and the support formations defined by the support posts define complementary engagement formations that can receive and locate respective pin-like formations in a configuration in which pivotal support of the platform is provided for.

8. The load carrying vehicle as claimed in claim 6, in which the platform support structure includes at least one holding member for each platform, for holding the platform in the operative position thereof.

9. The load carrying vehicle as claimed in claim 8, in which the platform support structure includes two holding members for each platform.

10. The load carrying vehicle as claimed in claim 9, in which the holding members, for each load platform, comprise adjustable length legs that can act between their load platform and the load deck of the vehicle for holding the load platform in the operative position thereof.

11. The load carrying vehicle as claimed in claim 10, in which the adjustable length legs for each load platform are secured to their platform at a location along the longitudinal edge of the platform that is disposed remote from the longitudinal edge thereof that is supported by the support posts, the operative lower ends of the legs being releasably locatable with respect to the load deck to provide for the support of the load platform in the operative position thereof.

12. The load carrying vehicle as claimed in claim 10, in which the legs for each load platform are hingedly secured to their load platform in a configuration in which they can fold onto the platform and be held in this position with respect to the platform, while the platform is disposed in the inoperative position thereof.

13. A The load carrying vehicle as claimed in claim 10, in which the vehicle has straps that can be suspended from the roof defined by the body of the load carrying compartment thereof, the straps defining engagement formations along the length thereof that are releasably engageable with complementary formations defined along the edge of each platform remote from the posts permitting, through such engagement, release of the platform from the posts and hence, by a tilting action, raising or lowering of the platform with respect to the posts and re-engagement with the posts, following which the length of the legs can be adjusted and the platform can be released from the straps.

14. The load carrying vehicle as claimed in claim 9, in which the holding members, for each load platform, are elongate struts that act between their platform and the support posts supporting the platform, the struts being pivotally secured to their platform and releasably engageable with respect to the support posts supporting the platform at different levels, that accommodate different platform levels.

15. The load carrying vehicle as claimed in claim 14, in which the ends of the struts that are engaged with support posts define pin-like formations projecting therefrom and the support posts define complementary engagement formations that can receive and locate the pin-like formations in a configuration in which adjustment of the position of the struts with respect to their support posts is permitted.

16. The load carrying vehicle as claimed in claim 1, in which the load item carrier structure includes locking means for releasably locking each platform with respect to the platform support structure at each selected level above a side half of the load deck.

17. The load carrying vehicle as claimed in claim 16, in which the locking means include locking pins that can cooperate with the platform support structure.

18. The load carrying vehicle as claimed in claim 1, in which the roof defined by the body of the load carrying compartment, of the vehicle is secured on the walls defined by the body that surround the compartment in a configuration in which the roof can be raised with respect to the said walls into a position in which loading of the load carrying compartment is facilitated.

19. The load carrying vehicle as claimed in claim 18, which includes a lifting and lowering mechanism for lifting and lowering the roof defined by the body of the load carrying compartment, the lifting and lowering mechanism being operable externally of the compartment by a lever arrangement.

20. A load item carrier structure for a load carrying vehicle having a body forming a load carrying compartment above a load deck, the load item carrier structure, in an operative configuration thereof located within the load carrying compartment of a vehicle, including
a plurality of load platforms for supporting load items thereon; and
a platform support structure located along the longitudinal centre line of the load deck of the vehicle, the platform support structure defining, for each load platform, a plurality of support formations at different levels above the load deck and providing for at least partial support of the load platform at a selected level above a side half of the load deck, as determined by the support formations.

* * * * *